Sept. 5, 1933.  H. E. ROTTMER  1,925,607
AUTOMOBILE BED
Filed July 25, 1931  3 Sheets-Sheet 1

Inventor:
Henry E. Rottmer,
By [signature]
Attys.

Sept. 5, 1933.    H. E. ROTTMER    1,925,607
AUTOMOBILE BED
Filed July 25, 1931    3 Sheets-Sheet 2
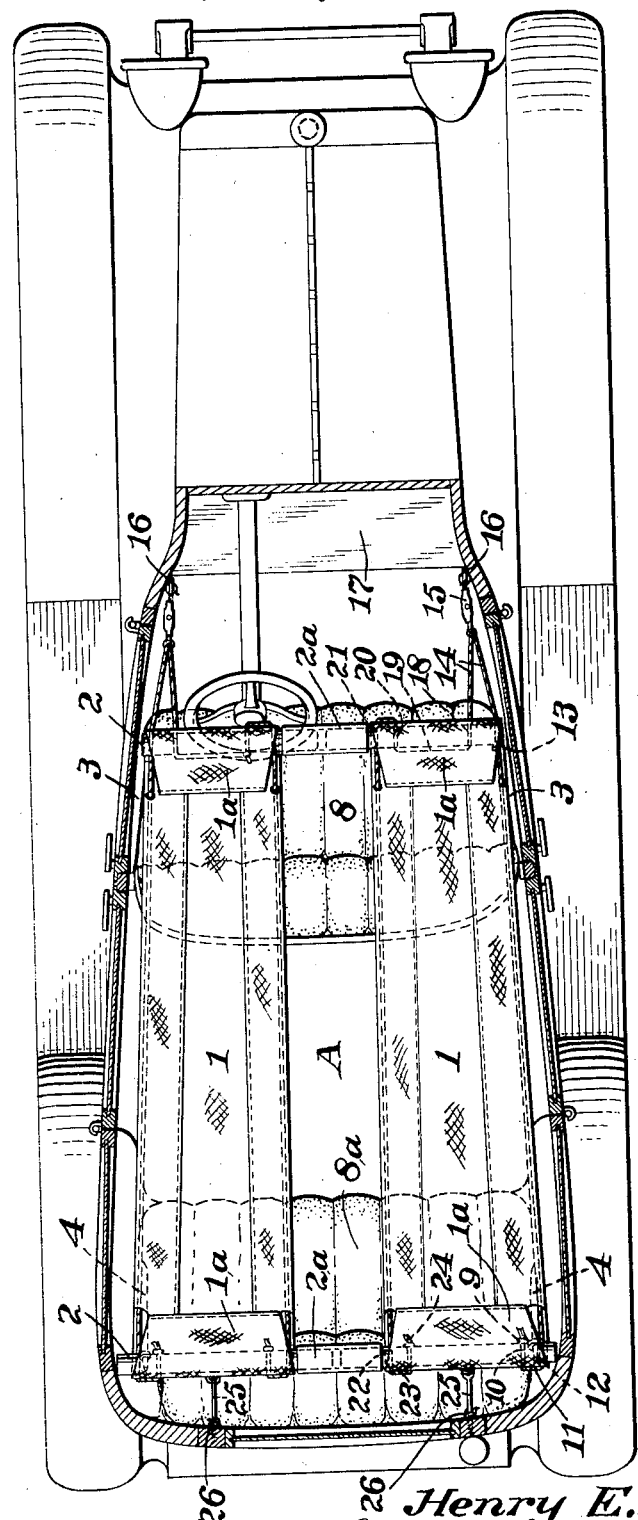
Inventor:
Henry E. Rottmer,
By Spear, Middleton, Donaldson & Hall
Attys.

Sept. 5, 1933.    H. E. ROTTMER    1,925,607
AUTOMOBILE BED
Filed July 25, 1931    3 Sheets-Sheet 3

Inventor:
Henry E. Rottmer,
By *Spear, Middleton, Donaldson & Hall*
Attys.

Patented Sept. 5, 1933

1,925,607

UNITED STATES PATENT OFFICE 1,925,607

AUTOMOBILE BED

Henry E. Rottmer, Washington, D. C.

Application July 25, 1931. Serial No. 553,156

8 Claims. (Cl. 5—118)

The invention relates to beds or cots to be demountably arranged within a vehicle such as an automobile.

One object of the invention is to provide such parts and arrangement thereof as will enable the whole organization to be assembled within the car body, avoiding all connections leading to the outside of the interior of the automobile.

Other objects of the invention will be clear from the following specification and the appended claims.

In the drawings

Fig. 2 is a sectional plan view.

Figure 1:
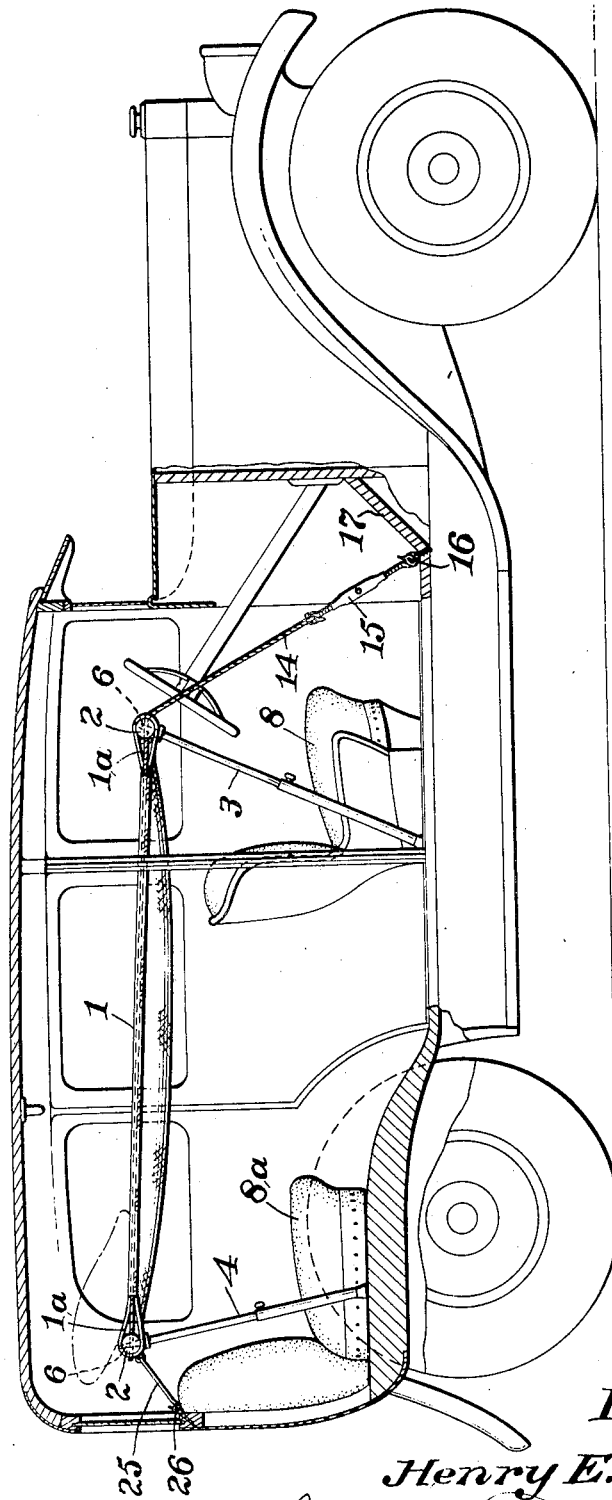
Figure 1 is a part elevation and a part sectional view looking from the side of the car.

In these drawings 1, 1 indicates the bed sections or cots composed of canvas or any other flexible material capable of sustaining the weight of the occupant of the bed or cot. This canvas or flexible material is supported by cross bars 2 at its ends and the two sections forming the complete bed are coupled together by coupling pieces 2a which are in the form of tubes receiving the ends of the cross bars 2. The cross bars at each corner of the complete bed organization are supported on standards supported from the floor of the car. A pair of these standards is shown at 3 at the front of the bed, and a second pair 4 is arranged at the rear of the bed, one member of this pair furnishing support for the outermost end of one of the cross bars at the rear of the bed. These cross bars may be perforated as shown at 5 and the upper end of the supporting standard may be tapered as at 6 to fit the opening in the cross bar. This upper end 6 may be in the form of a plug inserted with a drive fit into the steel tubing forming the upper part of the standard, and the cross bar may be reinforced at the point where the upper plug or point of the standard engages it by a metal ferrule shown at 7 in Fig. 4. The standards may each be formed in one piece or of telescopic parts such as at 3a, 3b, in Fig. 4, the part 3b being tubular and receiving the part 3a, the two parts being adjustably connected together by the set screw 3c.

Figures 3, 4:
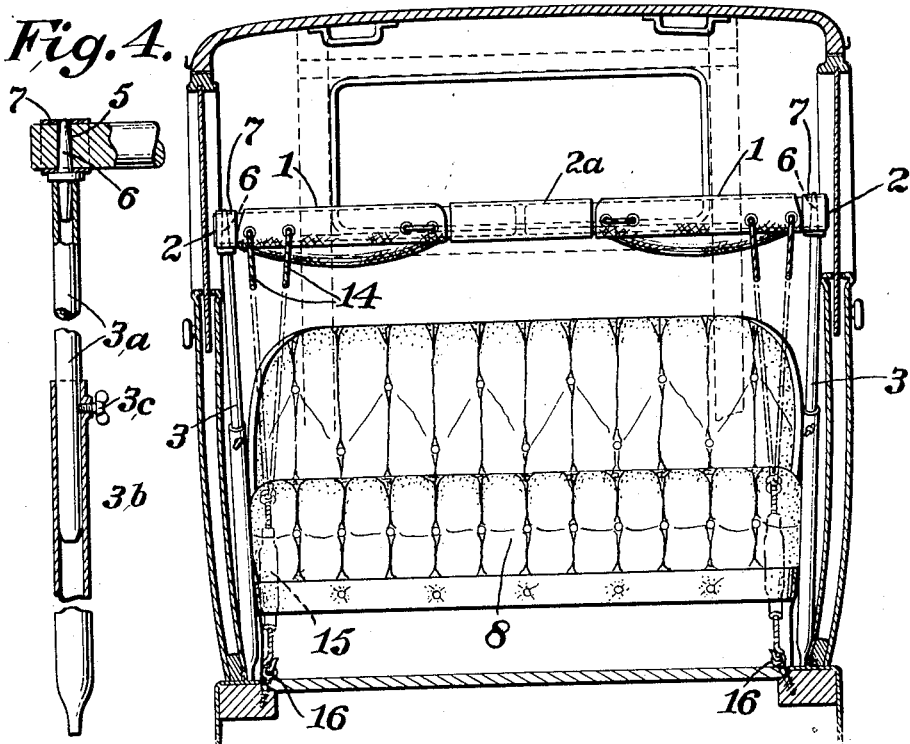
Fig. 3 is a cross sectional view.
Fig. 4 is a view in detail of the connection between a standard and a cross bar forming part of the supporting frame of the bed or cot.

The standards are of such form as to permit them to be inserted in the small space between the ends of the seat indicated at 8 in Fig. 3, and the adjacent part of the wall of the car. In the particular instance being described, the front standards 3 are inserted between the ends of the seat 8 and the door portion of the automobile, and the arrangement may be such as illustrated in Fig. 3 that a comparatively close fit is attained when the door is closed by contact of portions of the door with the standard so that the said standard is held in contact with the end of the seat of the automobile. At the rear of the cot or bed organization the standards 4 are adapted to be inserted between the end of the rear seat indicated at 8a and the adjacent wall of the car, so that said standard will be afforded support against lateral displacement by fitting in the comparatively narrow space between the car wall and the seat end, and in contact with both of these parts.

As shown in Fig. 1, the standards may be arranged in inclined position so as to get the best bracing and supporting effect, each pair of side standards converging downwardly in respect to each other as shown in Fig. 1. For securing the longitudinal stretch of the flexible material, and for affording means which will hold the bed or cot in the desired position against longitudinal movement, I provide straining means consisting in part of a rope which may be of textile material, or of wire, said rope being attached at one end to one of the rear cross bars at 9. It extends rearwardly through the cross bar as shown at 10, then along the rear side of the cross bar as shown at 11, then through the cross bar at 12, and then to the other cross bar or this cot or bed section at the front of the bed organization as shown at 13. From the front cross bar through which the rope extends, said rope extends in loop form as shown at 14 into connection with a turn buckle 15 which is secured to the frame of the automobile at 16, and preferably at or near the base of the inclined foot board 17 within the car. From the looped portion the rope extends back through the front bar at 18, then along the rear side of said bar as at 19, then forwardly through the bar as at 20, and along the front side thereof, and then rearwardly through the bar at point 21, and to the rear cross bar through which it extends at point 22, then along the bar at 23 and forwardly through said bar to its point of attachment thereto at 24. The stretch of rope between the front and rear cross bars passes through the margin of the flexible material and serves to support the cot or bed section at various points intermediate the front and rear cross bars. It will be noted that this straining and supporting rope is of one piece throughout the course above described, and where two sections or two cots are employed, making up the complete bed organization, a similar straining rope will be used in connection with the other section. These two sections 1, 1 are spaced apart so that the occupant can get into bed or get out therefrom by using the space A intermediate of these sections.

Figure 5:
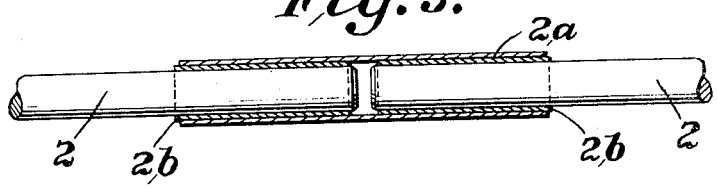
Fig. 5 is a detail view of coupling means between cross bars at the ends of the bed or cot.

The straining or supporting connection at the rear of the equipment consists of a hook or other suitable form of fastening indicated at 25 pivotally connected with the rear cross bar and engaging an eye 26 secured to the rail of the rear window, or any other suitable part at the rear portion of the framework of the vehicle. The coupling member 2a between the ends of adjacent cross bars of the bed sections or cots is shown in detail in Fig. 5. This is formed of metal tubing and is of an internal diameter to fit over metal ferrules 26 suitably secured to the end portions of the cross bars, which may be formed either of wood or of metal. In assembling the apparatus, the standards at one side of the car are inserted in place between the ends of the seat and the adjacent wall portions or supports of the car body. The cross bars secured to the ends of the flexible material forming the cots or bed sections are then engaged over the upper ends of the standards as shown in Fig. 4, and the two sections of the apparatus are supported at the middle portion thereof by the coupling members fitting over the projecting ends of the adjacent cross bars, these ends projecting far enough to nearly meet at the center of the coupling piece or tube so that substantial support will be afforded to these cross bars by engaging deeply within the opposite ends of the coupling members. The cross bars may be held within the end portions of the flexible strips or sheets forming the body of the cots or beds by the end portions of this flexible material as shown at 1a, being turned over the cross bars and secured in place to the body material, thus forming substantially a loop portion in which the cross bar is located.

Suitable flaps may be employed along the adjacent edges of the sections or cots so as to close up the space A between these sections, and this structure, whether it be one flap or two may be capable of manipulation by the occupant in either cot.

It will be seen from the above that I provide a bed or cot equipment adapted to be mounted wholly within the automobile, rendering unnecessary any outside equipment or connection, and that, aside from the four screw eyes indicated at 16 and 26, no fixed apparatus is used within the car in the way of an addition to the car frame, all the rest of the equipment being demountable, and capable of ready assembly by an unskilled person.

It will be observed from Fig. 2 that the cross bar sections at the rear of the structure bear against the inner side wall of the vehicle and at the front of the structure the standards 3, as shown in Figs. 2 and 3, find a bearing against the inner side of the car and more particularly speaking, against the window sill of the door. By this arrangement the car structure gains lateral support because it is fitted closely between the sides of the vehicle. It is possible to gain this support in various makes of cars because the cot structure is formed in sections, each having its own cot portion and these sections are adjustable laterally in respect to each other by reason of the fact that the front and rear cross bars are formed in sections held together at their adjacent ends by the coupling sleeves 2a. By reason of this lateral adjustment of the cot, the standards can always find a seat against the floor of the car at points beyond the seat ends and between these ends and the side wall of the car and both the front and rear standards reach down between the seat ends and the car wall so as to rest upon the floor of the car. It will be noted also that the stress applied to the cot sections longitudinally thereof by the straining ropes will be imparted to the cross bars at front and rear of the structure in a direction transverse of the axes of these cross bars and this stress will serve to lock the cross bars and the coupling pieces 2a into strong frictional engagement such as will maintain the adjustment of the two sections of the cot in the separated positions.

I claim:

1. A cot for automobiles comprising two lengthwise cot sections, and a frame to which the cot sections are connected, said frame including end bars and supporting standards at the ends of the bars, said bars provided with means by which they are adjustable in width laterally to enable the standards to gain support from lateral contact with parts of the car.

2. A cot for automobiles comprising two lengthwise cot sections and a frame comprising front and rear cross bars for each section and standards one for the outer end of each cross bar, said cross bars of one section being adjustably connected with the cross bars of the other section to increase or decrease the overall width of the cot to fit within the automobile and gain lateral support from parts of the car structure, and straining means for subjecting each cot section to longitudinal stress.

3. Apparatus according to claim 2 in which the standards are adapted to be inserted between the seat ends and the side walls of the car to support the cross bars from the floor of the car.

4. A cot for automobiles made up of two lengthwise cot sections, a cross bar at the front and rear of each section, detachable connections between the front cross bars and between the rear cross bars, standards connected with the cross bars located to extend down across the ends of the seats and gain support therefrom, and straining means for each cot section whereby each cot section can be placed under strain longitudinally, substantially as described.

5. In combination in a bed in two sections for an automobile, cross pieces in sections, a coupling between the sections, said coupled sections being adjustable laterally towards and from each other, flexible material in two longitudinal sections, each attached at its ends to two of the cross piece sections, means for supporting the cross piece sections consisting of a standard at the outer end of each cross bar, and means for giving longitudinal support to the cot comprising a separate rope or cable for each section, each of said ropes being attached at one end to one of the sections of the cross bar extending through the other cross bar section at the other end of the bed, and beyond the same to form a loop, the other strand of said loop extending through the second mentioned cross bar and thence to the first mentioned cross bar with the other end of said rope attached to said first mentioned cross bar, and means connected with the loop extension to strain said rope lengthwise, each of the loops being adjacent that end of the cross bar which is supported by a standard, substantially as described.

6. In combination with an automobile, a bed composed of two cot sections, each having a cross bar at front and rear, means detachably connecting the front cross bars to each other at their adjacent ends, means detachably connecting the rear cross bars at their adjacent ends, a standard at the outer end of each cross bar, said standards extending down across the ends of the seat structures, and straining means extending lengthwise of the cot sections and secured to the automobile structure, substantially as described.

7. A bed for automobiles comprising two cot sections arranged side by side, each of which is composed of a front cross bar and a rear cross bar with canvas held by and extending between the front and rear cross bars, a pair of standards for each cot section, said standards being connected with and extending down from the outer end portions of the cross bars, said cot sections being connected at the inner ends of the front and rear cross bars for lateral adjustment of the cot sections relative to each for contacting the car wall, and straining means for subjecting each cot section to stress in a direction lengthwise of the said cots, said straining means being attached to the car body, substantially as described.

8. A bed for automobiles according to claim 7 in which the adjustable connection between the cot sections serves to support each cot section at its inner side and the straining means is connected with the front and rear cross bars and extends downwardly therefrom to the points of attachment to the car structure, substantially as described.

HENRY E. ROTTMER.